United States Patent [19]
Fujita

[11] Patent Number: 5,570,221
[45] Date of Patent: Oct. 29, 1996

[54] LIGHT AMPLIFICATION DEVICE

[75] Inventor: Masayuki Fujita, Tokyo, Japan

[73] Assignee: NEC Corporation, Japan

[21] Appl. No.: 365,503

[22] Filed: Dec. 28, 1994

[30] Foreign Application Priority Data

Dec. 28, 1993 [JP] Japan ................................ 5-336771

[51] Int. Cl.$^6$ ............................ H04B 10/00; H01S 3/00
[52] U.S. Cl. .................... 359/161; 359/333; 359/341; 250/214 A
[58] Field of Search ................... 359/134, 174, 359/160–161, 333, 339, 341, 344; 372/6; 250/214 A

[56] References Cited

FOREIGN PATENT DOCUMENTS

| 0555063 | 8/1993 | European Pat. Off. ........... 359/161 |
| 4264532 | 2/1991 | Japan .................................. G02F 1/35 |

*Primary Examiner*—Leo Boudreau
*Assistant Examiner*—Kinfe-Michael Negash

*Attorney, Agent, or Firm*—Hayes, Soloway, Hennessey, Grossman & Hage, P.C.

[57] ABSTRACT

There is provided a light amplification device including a bandpass filter whose transmission center wavelength can be stabily tuned to the wavelength of an optical signal despite component temperature variations and deterioration over time. The transmission center wavelength of the bandpass filter (14) is swept and the intensity of the transmitted optical signal is simultaneously converted into an electrical signal by a photodetector (42). The electrical signal is subjected to first-order differentiation and second-order differentiation by a differential circuit (43). The wavelength of the optical signal is determined based upon a negative peak value of the current obtained by second-order differentiation. Thereafter, the transmission center wavelength of the bandpass filter is repeatedly swept within a band of several fractions of a nm using a transmission center wavelength obtained based upon the negative peak value. The transmission center wavelength of the bandpass filter (14) obtained when the current value obtained by first-order differentiation becomes "0" is sequentially set to the center wavelength of the band subjected to the next sweep.

12 Claims, 5 Drawing Sheets

LIGHT AMPLIFICATION DEVICE

BACKGROUND OF THE INVENTION

1. Field of the Invention

The present invention relates to a light amplification device using a bandpass filter and, more particularly, to a light amplification device comprising a control circuit for tuning the transmission center wavelength of the bandpass filter to the wavelength of an optical signal.

2. Description of the Prior Art

Among known direct light amplifiers for directly amplifying a light beam, there are the optical fiber amplifier which uses, as a light medium, a fiber which is obtained by doping a rare-earth element in its core, and a semiconductor light amplifier which utilizes dielectric emission phenomenon in the semiconductor. Each amplifier outputs an amplified optical signal and at the same time a spontaneous emission light beam generated in the amplification medium. When both the amplified optical signal and the spontaneous emission light beam are input to a light receiver, interference of these light components and interference of spontaneous emission light components occur, and these interferences become noise which degrades the signal-to-noise ratio of the light receiver. For this reason, a narrow-band bandpass filter which transmits only an optical signal is provided in the output section of an light amplifier. The transmission band of this narrow-band bandpass filter must be set at several fractions of a nm (nano-meter) to several nm (nanometer), so that the optical wavelength which can be used as an optical signal Is undesirably limited to the transmission band of this narrow-band bandpass filter. In order to eliminate this limitation, a tunable bandpass filter whose transmission band can be changed is used.

In use of the tunable bandpass filter, its transmission center wavelength must be tuned to the wavelength of an optical signal. For this purpose, a known light amplification device is used wherein the peak value of the intensity of the optical signal transmitted through the tunable bandpass filter, is detected, a transmission center wavelength at the time of the wavelength of the optical signal is determined, and the transmission center wavelength is tuned to the wavelength of the optical signal. The wavelength of the optical signal varies slightly with variations in the temperature of the transmission line or the like. There is proposed a light amplification device which dynamically tunes the transmission center wavelength of a tunable bandpass filter based on this wavelength variation.

FIG. 1 is a schematic diagram of a conventional light amplification device using a tunable bandpass filter. An optical signal input from an optical signal input terminal 11 is supplied to a first optical branching unit 12. One optical signal split by the first optical branching unit 12 is input to a light amplifier 13, and amplified. The amplified light is supplied to a bandpass filter 14, and the light transmitted therethrough is input to a second optical branching unit 15. One optical signal branched by the second optical branching unit 15 is supplied to an optical signal output terminal 16, and the other branched optical signal is supplied to a wavelength control circuit 17. The other optical signal split by the first optical branching unit 12 is input to the wavelength control circuit 17. A signal for controlling a transmission center wavelength is input from the wavelength control circuit 17 to the bandpass filter 14. The wavelength control circuit 17 compares the wavelengths of the optical signals input from the first optical branching unit 12 and the second optical branching unit 15 to control the transmission center wavelength of the bandpass filter 14 so as to make the wavelengths coincide with each other.

FIG. 2 is a schematic diagram of the wavelength control circuit 17 in FIG. 1. The optical signal input from an optical signal input terminal 21 is split by a third optical branching unit 23, and one split optical signal is input to a first photodetector 24. The other split optical signal is input to a first optical filter 25, and the input optical signal is attenuated therein with a transmission loss corresponding to its wavelength. The transmitted optical signal is the supplied to a second photodetector 26 in order to be converted into an electrical signal. The first and second photodetectors 24 and 26 are connected to a first differential amplifier 27. The difference between the output voltages of these photodetectors 24 and 26 is output from the first differential amplifier 27. The optical signal input from optical signal input terminal 22 is split by a fourth optical branching unit 31, and one split optical signal is supplied to a third photodetector 32 in order to be convened into an electrical signal. The other split optical signal is input to a second optical filter 33, and the optical signal transmitted therethrough is supplied to a fourth photodetector 34. The third and fourth photodetectors 32 and 34 are connected to a second differential amplifier 35. The first and second differential amplifiers 27 and 35 are connected to a third differential amplifier 36. The difference between the output voltages of the differential amplifiers 27 and 35 is output as a control signal from the third differential amplifier 36. This output is supplied to a control signal output terminal 37.

In this wavelength control circuit, the intensity of the optical signal received by the second photodetector 26 is lower than that received by the first photodetector 24 due to the transmission loss of the first optical filter. The transmission loss of the first optical filter 25 changes as a function of the wavelength of the optical signal to be transmitted. Therefore, the voltage output from the first differential amplifier 27 changes as a function of the wavelength of the optical signal. The voltage output from the second differential amplifier 35 changes as a function of the wavelength of a light transmitted through the second optical filter 33. For purposes of illustration assume that the first and second optical filters 25 and 33 have the same transmission loss characteristics. When the wavelengths of optical signals transmitted through the first and second optical filters 25 and 33 are the same, the voltages output from the first and second differential amplifiers 27 and 35 are the same. Therefore, the third differential amplifier 36 has no output voltage. In case of different wavelengths of optical signals, an output voltage appears at the third differential amplifier 36 because of the corresponding difference between the output voltages of differential amplifiers 27 and 35. The wavelength control circuit 17 controls the bandpass filter 14 so as not to generate an output voltage in the third differential amplifier 36. With this operation, the transmission center wavelength of the bandpass filter 14 can be tuned to the wavelength of the optical signal. This conventional light amplification device is disclosed in Japanese Unexamined Patent Publication No. 4-264532.

In this conventional light amplification device, wavelength differences cannot be detected with high precision unless the transmission characteristics of the two optical filters, the splitting ratios of two optical branching units, and the photo-electric sensitivities of the two photodetectors used in the wavelength control circuit are all respectively identical to each other. For this reason, these components must have a high precision. The characteristics of these components vary with changes in ambient temperature and deterioration over time. Therefore, it is not easy to stably tune the transmission center wavelength of the bandpass filter to the wavelength of an optical signal. In addition, a small wavelength difference cannot be detected unless the rate of change of the transmission loss corresponding to the wavelength of each optical filter is increased to a certain degree. If the rate of change of the transmission loss corresponding to the wavelength of the optical filter Is increased, the operating band of the optical filter is narrowed so as to limit the usable wavelength band of the optical signal. On the other hand, the optical signal's usable wavelength band can be widened In the light amplification device, which detects the peak value of the intensity of the optical signal transmitted through a bandpass filter, determines the transmission center wavelength simultaneously with the wavelength of the optical signal, and tunes the transmission center wavelength to the wavelength of the optical signal. However, the maximum intensity of a spontaneous emission light beam may be greater than the intensity of the optical signal, so the transmission center wavelength cannot be accurately tuned to the optical signal.

SUMMARY OF THE INVENTION

It is an object of the present invention to provide a light amplification device which can stably tune the transmission center wavelength of a bandpass filter to the wavelength of an optical signal with high precision without being adversely affected by the characteristics of the optical components and electrical components used to control the transmission center wavelength.

It is another object of the present invention to provide a light amplification device which can tune the transmission center wavelength of a bandpass filter to the wavelength of an optical signal in a wide band.

According to an aspect of the present invention, a light amplification device comprises: a light amplifier for inputting and amplifying an optical signal; a bandpass filter for transmitting an optical signal having a wavelength within a predetermined transmission band of optical signals output from said light amplifier; transmission center wavelength sweep means for sweeping a transmission center wavelength of said bandpass filter in a predetermined band at a predetermined speed; a photoelectric converter for converting an intensity of the optical signal transmitted through said bandpass filter into an electrical signal; a differentiating circuit for performing second-order differentiation on the electrical signal converted by said photoelectric converter using time as a variable; and sweep stop means for stopping sweep of the transmission center wavelength of said bandpass filter when a value differentiated by said differentiating circuit has a negative peak.

In the present invention, the transmission center wavelength of the bandpass filter is swept at a constant speed. A change in intensity of the transmitted optical signal with the sweep of the transmission center wavelength is performed with second-order differentiation using time as a variable. When the transmission center wavelength of the bandpass filter coincides with the wavelength of the optical signal, the differentiated value has the negative peak, when this is detected, is stopped. With this operation, the transmission center wavelength of the bandpass filter can be tuned to the wavelength of the optical signal. Although the wavelength of the optical signal is present at a point at which a differentiated value obtained by performing first-order differentiation on the transmission center wavelength, a point at which a differentiated value becomes "0" is present in a band of spontaneous emission light. In contrast to this, the negative peak of the differentiated value performed with second-order differentiation appears only when the transmission center wavelength of the bandpass filter is tuned to the wavelength of the optical signal. For this reason, the wavelength of the optical signal can be detected in a wide band. In addition, since the wavelength of the optical signal is detected using the differentiated value, the transmission center wavelength can be tuned to the wavelength of the optical signal without being adversely affected by a variation in characteristics of optical components and electrical component to be used.

According to another aspect of the present invention, a light amplification device comprises: a light amplifier for inputting and amplifying an optical signal; a bandpass filter for transmitting an optical signal having a wavelength within a predetermined transmission band of optical signals output from said light amplifier; transmission center wavelength sweep means for repeatedly sweeping a transmission center wavelength of said bandpass filter at a predetermined speed In a band of several fractions of a nm which is initially set and includes the wavelength of the optical signal; a photoelectric converter for converting an intensity of the optical signal transmitted through said bandpass filter into an electrical signal; a differentiating circuit for performing first-order differentiation on the electrical signal convened by said photoelectric converter using time as a variable; and sweep center wavelength change means for changing a transmission center wavelength of said bandpass filter obtained when a differentiated value obtained by the first-order differentiation by said differentiating circuit becomes "0" as a center wavelength of a band subjected to a next sweep by said transmission center wavelength sweep means.

In the present invention the transmission center wavelength of the bandpass filter is repeatedly swept within a narrow band Including the wavelength of the optical signal. When the intensity of the transmitted optical signal at this time is differentiated by first-order differentiation using time as a variable, the wavelength of the optical signal can be detected as a point at which the differentiated value becomes "O". This wavelength is sequentially modified as the center wavelength of the band subjected to the next sweep to make it possible to trace the transmission center wavelength of the bandpass filter with respect to a variation in wavelength of the optical signal. Since the sweep band is set narrow, the differentiated value becomes "O" only when the transmission center wavelength of the bandpass filter is tuned to the wavelength of the optical signal. Even when the transmission center wavelength is repeatedly swept within a band of several nm using the wavelength of the optical signal as a center, reception of the optical signal transmitted through the bandpass filter is rarely affected.

According to still another aspect of the present invention, a light amplification device comprises: a light amplifier for inputting and amplifying an optical signal; a bandpass filter for transmitting an optical signal having a wavelength within a predetermined transmission band of optical signals output from the light amplifier; transmission center wavelength sweep means for sweeping a transmission center wavelength of the bandpass filter in a predetermined band at a predetermined speed; a photoelectric converter for converting an intensity of the optical signal transmitted through the bandpass filter into an electrical signal; a differentiating circuit for performing first-order differentiation and second-order differentiation on the electrical signal converted by the photoelectric converter using time as a variable; narrow-band sweep means for repeatedly sweeping a transmission center wavelength of the bandpass filter at a predetermined speed in a band of several fractions of a nm using a transmission center wavelength of the bandpass filter obtained when a negative peak value of a differentiated value obtained by the second-order differentiation by the differentiating circuit is detected as a center; and sweep center wavelength setting means for setting a transmission center wavelength of the bandpass filter obtained when a differentiated value obtained by the first-order differentiation by the differentiating circuit becomes "0" to a center wavelength of a band subjected to a next sweep by the narrow-band sweep means while a transmission center wavelength is repeatedly swept by the narrow-band sweep means.

In the present invention, the transmission center wavelength of the bandpass filter is swept, and the intensity of the transmitted optical signal is differentiated by first-order differentiation and second-order differentiation. First of all, the transmission center wavelength of the bandpass filter is tuned to the wavelength of the optical signal by detecting the negative peak of the differentiated value obtained by second-order differentiation. Then, the transmission center wavelength is repeatedly swept in a band of several fractions of a nm using the wavelength of the optical signal as an initial center. A transmission center wavelength obtained when the differentiated value obtained by first-order differentiation becomes "0" is set as the center wavelength of the band subjected to the next sweep.

DETAILED DESCRIPTION OF PREFERRED EMBODIMENT

The present invention will now be described below with reference to the accompanying drawings.

Figure 1:
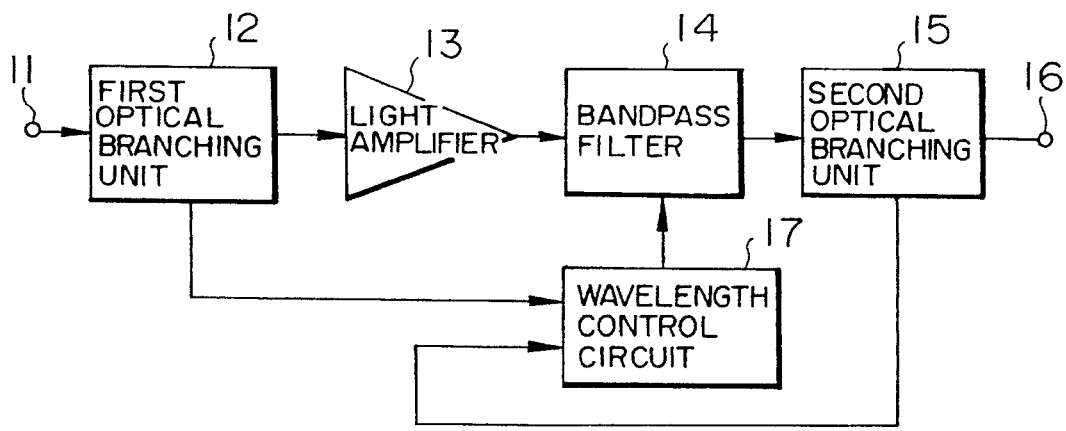
FIG. 1 is a block diagram showing the arrangement of a conventional light amplification device comprising a wavelength control circuit for tuning the transmission center wavelength of a bandpass filter to the wavelength of the optical signal.
Figure 3:
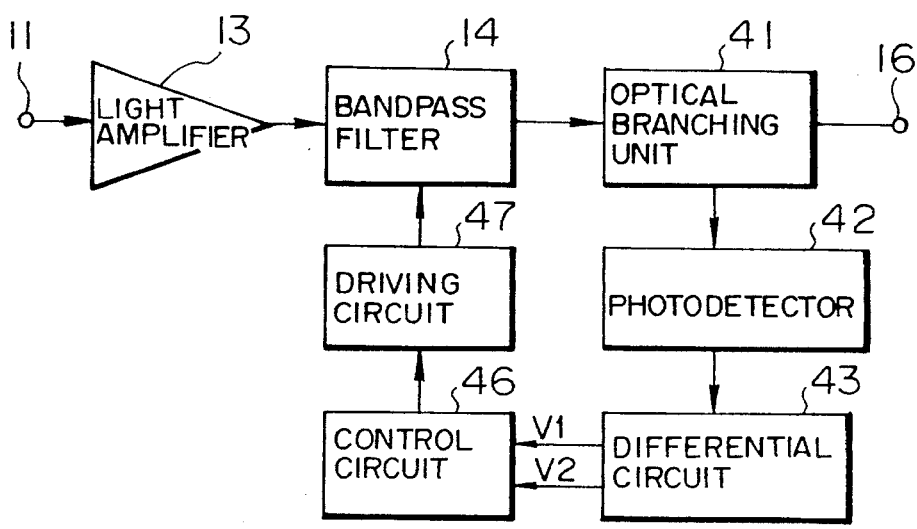
FIG. 3 is a block diagram showing the arrangement of a light amplification device according to an embodiment of the present invention.
Figure 2:
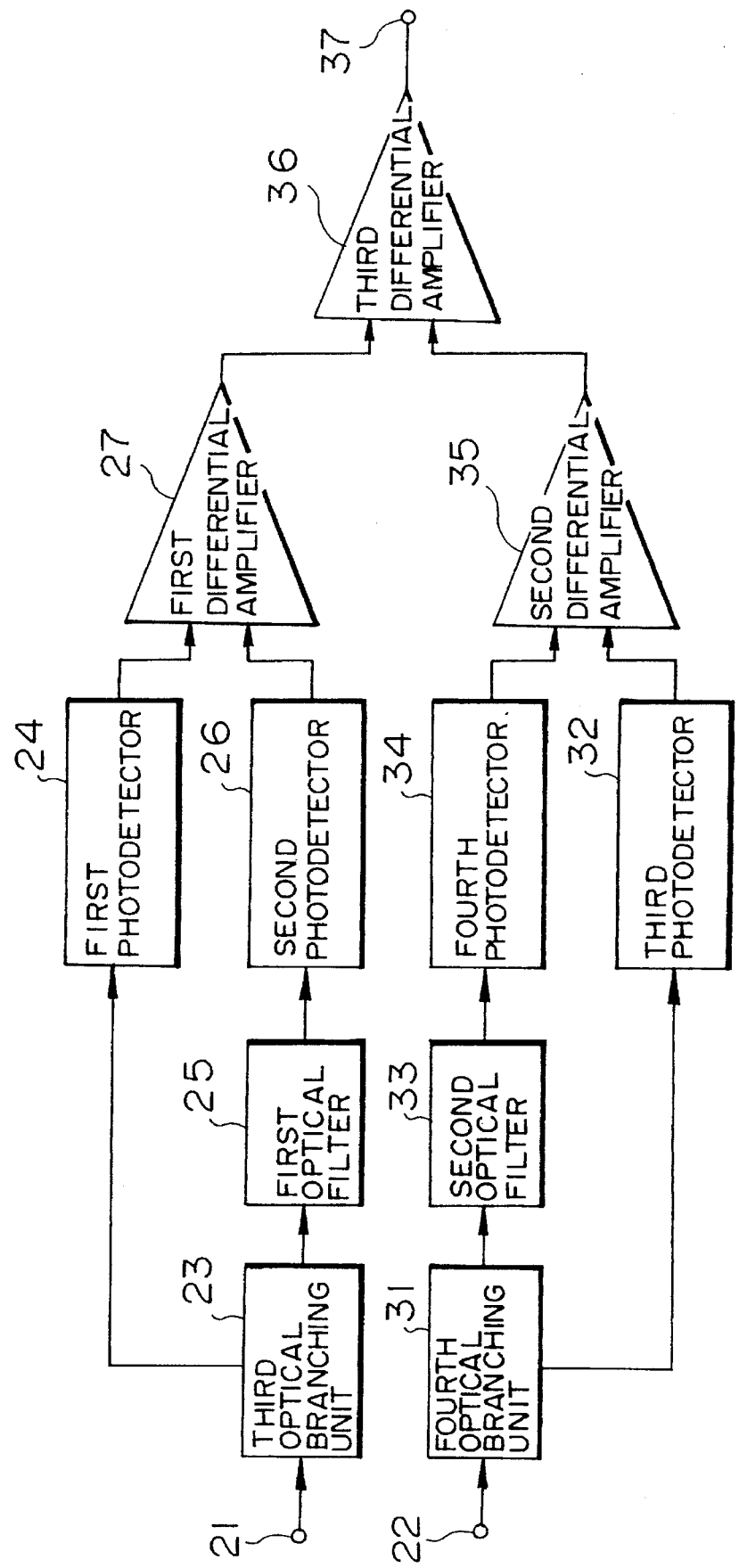
FIG. 2 is a block diagram showing the arrangement of the wavelength control circuit used in the conventional light amplification device.

FIG. 3 is a schematic diagram of a light amplification device according to an embodiment of the present invention. An optical signal input terminal 11 is connected to a light amplifier 13. An optical signal amplified by the light amplifier 13 is input to a bandpass filter 14. The bandpass filter 14 transmits light having a wavelength within the transmission band of the bandpass filter 14. The transmitted light is split by an optical branching unit 41. One split light signal is guided to an optical signal output terminal 16, and the other split light signal is convened into an electrical signal by a photodetector 42. The photodetector 42 is connected to a differential circuit 43. A signal V1 obtained by first-order differentiation and a signal V2 obtained by second-order differentiation are input to a control circuit 46. The control circuit 46 is connected to a driving circuit 47. An output from the driving circuit 47 is input to the bandpass filter 14 as a control signal for the transmission center wavelength.

The light amplifier 13 is constituted by a rare-earth-doped fiber, an excitation light source for supplying an excited light beam to the rare-earth-doped fiber, and an excitation light source driving circuit for generating an exaltation current for driving this excitation light source, all of which are not shown. The bandpass filter 14 has a transmission band of several rim, and its transmission center wavelength can be freely changed. In this bandpass filter, a filter is used in which a glass on which a dielectric multilayer is deposited is arranged between end faces of two optical fibers, and a voltage applied to a piezoelectric element which supports the glass is controlled to change the angle of the glass with respect to the end faces. Since the transmission center wavelength of each dielectric multilayer is changed in accordance with an incident angle of a light beam, the dielectric multilayer can be controlled by changing the voltage to be applied to the piezoelectric element. The optical branching unit 41 and the photodetector 42 use a fiber fusion type optical coupler and a PIN photodiode, respectively. The differential circuit 43 outputs the current signals V1 and. V2 obtained by performing first-order differentiation and second-order differentiation on an input current signal. The driving circuit 47 is a voltage source for generating the voltage applied to the piezoelectric element. The control circuit 46 controls the voltage generated by the voltage source.

Figure 4:
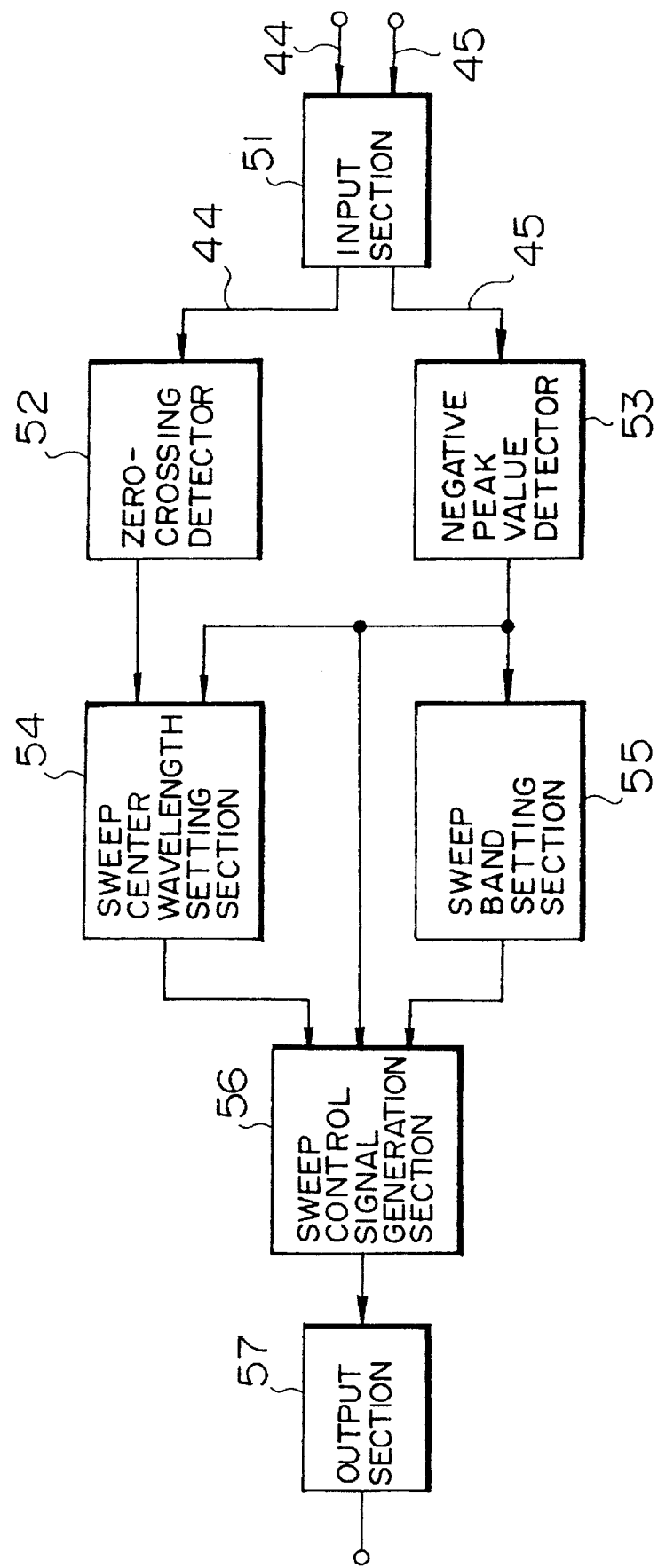
FIG. 4 is a block diagram showing the arrangement of the control circuit in the embodiment of FIG. 3.

FIG. 4 is a schematic diagram of the control circuit in FIG. 3 The current signal V1 obtained by first-order differentiation and the current signal V2 obtained by second-order differentiation are respectively input to a zero-crossing detector 52 and a negative peak value detector 53 through an input section 51 which inputs the current signal V1 obtained by first-order differentiation and the current signal V2 obtained by second-order differentiation. The zero-crossing detector 52 is connected to a sweep center wavelength setting section 54. The negative peak value detector 53 is connected to a sweep band setting section 55, the sweep center wavelength setting section 54, and a sweep control signal setting section 56. Outputs from the sweep center wavelength setting section 54 and the sweep band setting section 55 are input to the sweep control signal generation section 56. The sweep control signal generation section 56 is connected to an output section 57.

Figure 5:
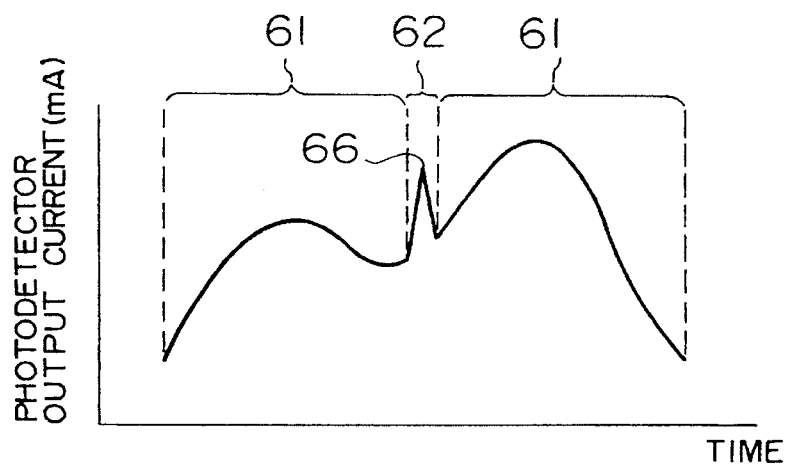
FIG. 5 is a chart showing an example of an output current waveform from the photodetector in the embodiment of FIG. 3.

FIG. 5 shows a change in output current from the photodetector when the transmission center wavelength of the bandpass filter is swept by the control circuit.

Figure 6:
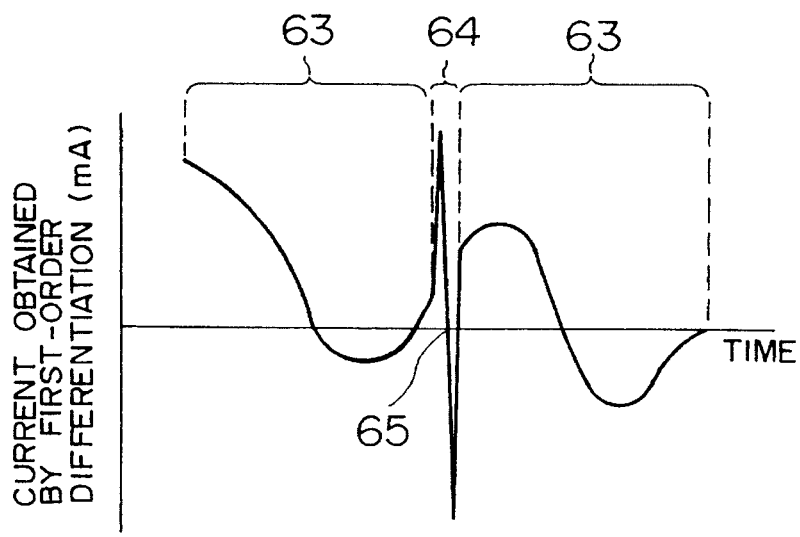
FIG. 6 is a chart showing an example of a current waveform obtained by performing first-order differentiation on an output current from the photodetector in the embodiment of FIG. 3.

A moderately curved portion 61 represents the intensity of a spontaneous emission light beam output from the optical amplifier 13. A portion 62 which abruptly changes midway along the moderately curved portion 61 and projects like a needle represents the intensity of the optical signal. FIG. 6 represents a current waveform after performing first-order differentiation on the output current shown in FIG. 5 by the differential circuit 43. A moderately changing portion 63 represents a differentiated value corresponding to a change in intensity of the spontaneous emission light beam. Portion 64 which abruptly changes in positive and negative directions, represents a differentiated value Corresponding to the intensity of the optical signal. Point 65 at which a current value becomes "0" midway along the portion (which abruptly changes from the positive region to the negative region) corresponds to a point 66 representing the maximum intensity of the optical signal in FIG. 5.

Figure 7:
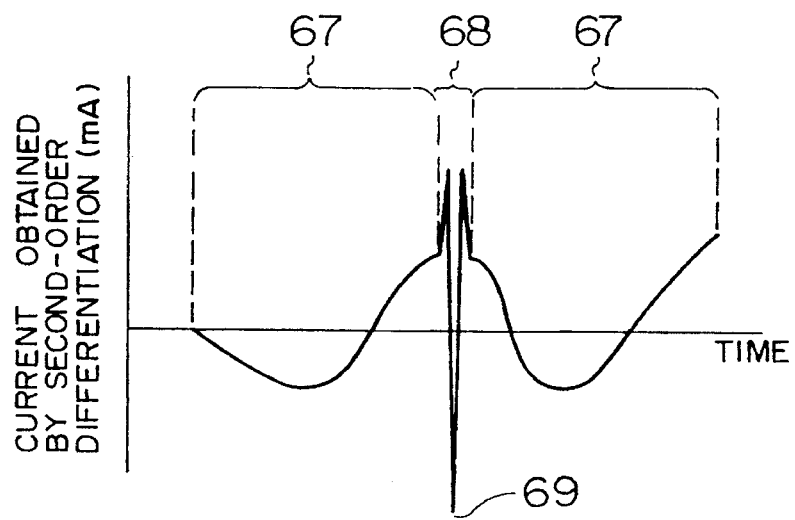
FIG. 7 is a chart showing an example of a current waveform obtained by performing second-order differentiation on the output current from the photodetector in the embodiment of FIG. 3.

FIG. 7 represents a current waveform after performing second-order differentiation on the output current shown in FIG. 5 by the differential circuit 43. A moderately changing portion 67 represents a characteristic obtained, by performing second-order differentiation on a current value corresponding to the intensity of the spontaneous emission light beam. A portion 68 which abruptly changes to a negative vane after an abrupt change to a positive valve, and again abruptly changes to the positive vane represents a second-order-differentiated value Corresponding to the Intensity of the optical signal. A needle-shaped vertex 69 which abruptly projects to a negative valve represents the maximum intensity of the optical signal, and corresponds to point 66 in FIG. 5.

The transmission center wavelength of the bandpass filter 14 is swept by the control circuit 46 shown in FIG. 3. Thereafter, the current waveforms shown in FIGS. 5, 6, and 7 are output from the photodetector 42 and the differential circuit 43. The negative peak value detector 53 detects the negative peak value of the current signal V2 obtained by second-order differentiation, i.e., the point 69 in FIG. 7. The transmission center wavelength of the bandpass filter 14 at this time is tuned to the wavelength of the optical signal. When the negative peak value is detected, the transmission center wavelength is set in the sweep center wavelength setting section 54, and a bandwidth of several fractions of a nm is set in the sweep band setting section 55. The sweep control signal generation section 56 generates a control signal for repeatedly sweeping the transmission center wavelength of the bandpass filter 14 using the center wavelength and the bandwidth respectively set in the sweep center wavelength setting section 54 and the sweep band setting section 55. Therefore, after detecting the negative peak value, the transmission center wavelength of the bandpass filter 14 is repeatedly swept in the band of several fractions of a nm using the wavelength of the optical signal as the center.

For purposes of illustration, assume that the center wavelength of the optical signal slightly varies due to variations in temperature of the transmission line. The center wavelength of the sweep band is shifted from the wavelength of the optical signal due to the variations in wavelength of the optical signal. Since this shift, however, is gradually generated, the next sweep is performed while the wavelength of the optical signal is present in the sweep band. When the transmission center wavelength of the bandpass filter 14 is tuned to the wavelength of the optical signal, the current signal V1 obtained by first-order differentiation becomes "0", and this state is detected by the zero-crossing detector 52. That is, point 65 in FIG. 6 is detected. The transmission center wavelength of the bandpass filter 14 at this time is set in the sweep center wavelength setting section 54, and serves as the center wavelength of the next sweep. As a result, the next sweep is performed using the wavelength of the optical signal as the center wavelength again. In this manner, the variation in wavelength of the optical signal can be traced by modifying the center wavelength of the band to be swept. In this case, the transmission center wavelength of the bandpass filter 14 is repeatedly swept in the band of several fractions of nm, and the wavelength of the optical signal does not accurately coincide with the transmission center wavelength. However, the sweep within such a bandwidth does not adversely affect reception of the transmitted optical signal by the optical receiver. This is because the transmission band of the bandpass filter is about 10 times wider than the bandwidth to be swept. Note that the sweep ratio is properly set at several kHz/sec.

Figure 8:
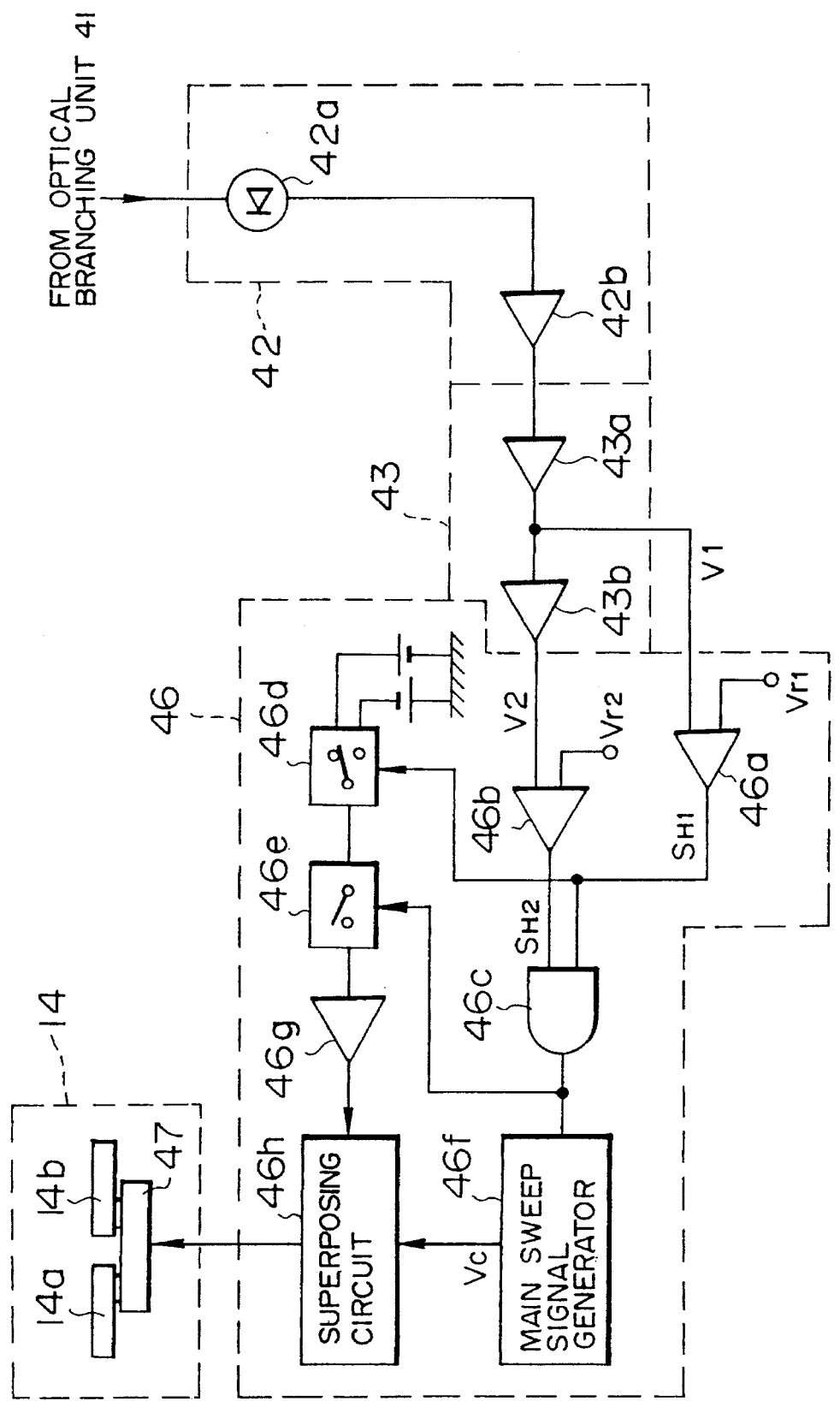
FIG. 8 is a block diagram showing a detailed circuit diagram of the control circuit in the embodiment in FIG. 3.

FIG. 8 shows a detailed circuit diagram of the control circuit 46 in FIG. 3. The reference numerals used in FIG. 3 denote the same parts in FIG. 8. In this detailed example, the bandpass filter 14 is a tunable filter and is a fiber type Fabry-Perot filter constituted by covering half mirrors on opposing faces of two opposing optical fibers. The gap between the opposing faces of the two optical fibers is adjusted by controlling the voltage to be applied to a piezoelectric actuator.

The photodetector 42 is constituted by an output monitor photodiode 42a and an I–V converter 42b. Part of the optical signal passing through the bandpass filter 14 is split by the optical branching unit 41, and its level is monitored by the output monitor photodiode 42a of the photodetector 42. The output current from the output monitor photodiode 42a is converted into a voltage signal by the I–V converter 42b. An output current from the I–V converter 42b is subjected to first-order differentiation by a differentiating element 43a of the differential circuit 43 and is output as the electrical signal V1. This electrical signal V1 is input to a comparator 46a of the control circuit 46. In the differential circuit 43, the electrical signal vi output from the differentiating element 43a is further differentiated by a next differentiating element 43b and is input to a comparator 46b of the control circuit 46 as the electrical signal V2.

The control circuit 46 is constituted by an AND circuit 46c which calculates a logical product of the outputs from both the comparators 46a and 46b, a switch 46d which is turned on or off in accordance with the output from the comparator 46a, a switch 46e which is turned on or off in accordance with the output from the AND circuit 46c, a main sweep signal generator 46f which starts and stops the sweep operation in accordance with the output from the AND circuit 46c, an integrating circuit 46g, and a superimposing circuit 46h.

In the control circuit 46, the electrical signal V1, obtained by first-order differentiation from the differential circuit 43 is compared with reference voltage Vr1 for zero point detection by the comparator 46a. When V1=Vr1, a TTL-High signal $S_{H1}$ is output. With this operation, the zero-crossing point 65 shown in FIG. 6 is detected. On the other hand, the electrical signal V2 obtained by second-order differentiation from the differential circuit 43 is compared with reference voltage Vr2 for peak detection by the comparator 46b. When V2≦Vr2, a TTL-High signal $S_{H2}$ is output. With this operation, the negative peak point 69 shown in FIG. 7 is detected.

The voltage obtained by second-order differentiation has a peak value only when the High signal $S_{H2}$ is output from the comparator 46a and the High signal $S_{H2}$ is output from the comparator 46b, so that this timing can be detected as an output from the AND circuit 46c. The sweep operation of the main sweep signal generator 46f is stopped in accordance with the output signal from the AND circuit 46c, and an output voltage Vc at the time is held. With this operation, the transmission center wavelength of the bandpass filter 14 can be set.

When the sweep signal is disabled, the switch 46e is turned on in accordance with the output from the AND circuit 46c, and a constant voltage is input to the integrating circuit 46g. At this time, an output voltage from the integrating circuit 46g is monotonically increased or decreased in accordance with the polarity of an input voltage. The polarity of the input voltage to the integrating circuit 46g is reversed by the switch 46d which is turned on or off in accordance with the output from comparator 46a. For this reason, the output voltage from the integrating circuit 46g has a triangular wave using OV as the center.

A voltage which is finally applied to piezoelectric actuator 47 becomes the voltage obtained by making the output voltage Vc from the main sweep signal generator 46f redundant with the triangular wave voltage from the integrating circuit 46g. The transmission center wavelength of the bandpass filter 14 is settled in a continuously, slightly varying state with the wavelength of the optical signal as the center.

The above-mentioned differential circuit 43 of this embodiment differentiates the current signal input from the photodetector 42. The differential circuit 43, however, is not limited to this, and it may convert a current signal into a voltage signal, and then may differentiate the converted voltage signal. The rare-earth-doped fiber of the optical amplifier is used as the amplification medium. In addition to this, an optical amplifier such as a semiconductor optical amplifier which directly amplifies an optical signal can be used. The bandpass filter 14, in addition to the one used in this embodiment, may be a filter whose transmission center wavelength can be controlled such thin the gap formed by arranging two dielectric multilayers parallel with each other is adjusted by a piezoelectric element to change the resonant wavelength of the dielectric multilayers. The optical branching unit 41 may be a half mirror in addition to the fiber fusion type optical coupler.

According to this embodiment, after the transmission center wavelength of the bandpass filter is temporarily tuned to the wavelength of the optical signal using the current signal obtained by second-order differentiation, the variation in wavelength of the optical signal is traced using the current signal obtained by first-order differentiation. The transmission center wavelength may be fixed when the negative peak value obtained by second-order differentiation is detected. In this case, however, the transmission center wavelength of the bandpass filter cannot be tuned to the variation in wavelength of an optical signal. Moreover, when the wavelength of an optical signal is known in advance, the known wavelength is set as the initial value of the center wavelength of the band to be swept without detecting the wavelength of the optical signal using second-order differentiation, and only the wavelength in which the current value obtained by first-order differentiation becomes "0" is followed.

As has been described above, according to the present invention, the transmission center wavelength of the bandpass filter is swept, and the intensity of the optical signal transmitted through this bandpass filter is converted into an electrical signal. This signal is obtained by second-order differentiation using time as a variable, and when the negative peak value appears, the sweep is stopped. For this reason, the transmission center wavelength of the bandpass filter can be efficiently tuned to the wavelength of the optical signal in a wide band, and the wavelength of the optical signal which can be used in optical communication is not limited by the transmission wavelength of the bandpass filter of the light amplification device. Even when the maximum intensity of the spontaneous emission light beam is higher than the intensity of the optical signal, the transmission center wavelength can be accurately tuned to the wavelength of the optical signal. Since the wavelength of the optical signal is detected with reference to the differentiated value, a high detection precision can be assured without strictly limiting the characteristics of optical components and electrical components to be used, and this facilitates constitution of the light amplification device. If the characteristics of the components to be used change due to temperature variation and deterioration over time, detection precision is rarely affected in obtaining a stable operation. The control section for the transmission center wavelength of the bandpass filter can be constituted without using a specific optical component or a specific electrical component to realize the light amplification device, and at low cost.

According to the present invention, the transmission center wavelength of the bandpass filter is repeatedly swept in a band of several fractions of a nm including the wavelength of an optical signal. The intensity of a light beam transmitted through this bandpass filter is converted into an electrical signal. When a value obtained by performing first-order differentiation on this signal becomes "0", the transmission center wavelength at this time is made to serve as the center wavelength of the band subjected to the next sweep. With this operation, even when the wavelength of the optical signal varies with changes in temperature of the transmission line or with deterioration over time, the transmission center wavelength of the bandpass filter can be continuously tuned to the wavelength of the optical signal. Further, since the tuning precision is rarely affected by variations in characteristics of the components to be used, the transmission center wavelength can be efficiently tuned to the wavelength of the optical signal with stable precision.

According to the present invention, even if the wavelength of the optical signal is not known, the transmission center wavelength of the bandpass filter can be tuned to the wavelength of the optical signal. In addition, if the wavelength of the optical signal varies with temperature variations or the like, the wavelength can be efficiently followed.

What we claim is:

1. A light amplification device, comprising:

a light amplifier for amplifying an inputted optical signal;

a bandpass filter for transmitting an optical signal having a wavelength within a predetermined transmission band of optical signals output from said light amplifier;

controllable transmission center wavelength sweep means included at least partially within said bandpass filter for sweeping a transmission center wavelength of said bandpass filter in a predetermined band at a predetermined speed;

a photoelectric converter for converting an intensity of the optical signal transmitted through said bandpass filter into an electrical signal;

a differentiating circuit for performing second-order differentiation on the electrical signal converted by said photoelectric converter using time as a variable, and for generating a differentiated value representative of said second-order differentiation; and sweep stop means for receiving said differentiated value from said differentiating circuit and for supplying control signals to said controllable transmission center wavelength sweep means to cause said transmission center wavelength sweep means to stop sweep of the transmission center wavelength of said bandpass filter when the differentiated value generated by said differentiating circuit has a negative peak.

2. A device according to claim 1, wherein said light amplifier comprises a rare-earth-doped fiber as an amplification medium.

3. A device according to claim 1, wherein said light amplifier is a semiconductor optical amplifier.

4. A device according to claim 1, wherein said bandpass filter is a fiber type Fabry-Perot filter constituted by two opposing optical fibers whose opposing end faces are covered with half mirrors, and said transmission center wavelength sweep means comprises a piezoelectric actuator for changing a gap between said opposing end faces of said fiber of said fiber type Fabry-Perot fiber.

5. A light amplification device, comprising:

a light amplifier for amplifying an inputted optical signal;

a bandpass filter for transmitting an optical signal having a wavelength within a predetermined transmission band of optical signals output from said light amplifier;

controllable transmission center wavelength sweep means included at least partially within said bandpass filter for repeatedly sweeping a transmission center wavelength of said bandpass filter at a predetermined speed in a band of several fractions of a nm which is initially set and includes the wavelength of the optical signal;

a photoelectric converter for converting an intensity of the optical signal transmitted through said bandpass filter into an electrical signal;

a differentiating circuit for performing first-order differentiation on the electrical signal converted by said photoelectric converter using time as a variable, and for generation a differentiated value representative of said first-order differentiation; and sweep center wavelength change means for receiving said differentiated value from said differentiating circuit and for supplying control signals to said controllable transmission center wavelength sweep means for commanding said transmission center wavelength sweep means to change a transmission center wavelength of said bandpass filter obtained when the differentiated value generated by said differentiating circuit becomes "0" as a center wavelength of a band subjected to a next sweep by said transmission center wavelength sweep means.

6. A light amplification device, comprising:

a light amplifier for amplifying an inputted optical signal;

a bandpass filter for transmitting an optical signal having a wavelength within a predetermined transmission band of optical signals output from said light amplifier;

controllable transmission center wavelength sweep means included at least partially within said bandpass filter for sweeping a transmission center wavelength of said bandpass filter in a predetermined band at a predetermined speed;

a photoelectric converter for converting an intensity of the optical signal transmitted through said bandpass filter into an electrical signal;

a differentiating circuit for performing first-order differentiation and second-order differentiation on the electrical signal converted by said photoelectric converter using time as a variable, and for generating first-order and second order differentiation values representative of said first and second-order differentiations, respectively;

narrow-band sweep means for receiving said second-order differentiation value from said differentiation circuit and for repeatedly sweeping a transmission center wavelength of said bandpass filter at a predetermined speed in a band of several fractions of a nm using a transmission center wavelength of said bandpass filter obtained when a negative peak value of the second-order value generated by said differentiating circuit is detected as a center; and sweep center wavelength setting means receiving said first-order differentiation value from said differentiation circuit and for setting a transmission center wavelength of said bandpass filter obtained when the first-order value generated by said differentiating circuit becomes "0" to a center wavelength of a band subjected to a next sweep by said narrow-band sweep means while a transmission center wavelength is repeatedly swept by said narrow-band sweep means.

7. A light amplification device, comprising:

a light amplifier for amplifying an inputted optical signal;

a bandpass filter for transmitting an optical signal having a wavelength within a predetermined transmission band of optical signals output from said light amplifier;

an optical signal branching unit for branching the optical signal from said bandpass filter into first and second branched optical signals;

controllable transmission center wavelength sweep means included at least partially within said bandpass filter for sweeping a transmission center wavelength of said first branched optical signal in a predetermined band at a predetermined speed;

a photoelectric converter for converting an intensity of said second branched optical signal transmitted through said bandpass filter into an electrical signal;

a differentiating circuit for performing second-order differentiation of the electrical signal converted by said photoelectric converter using time as a variable, and for generating a differentiated value representative of said second-order differentiation; and sweep stop means for receiving said differentiated value from said differentiating circuit and for supplying control signals to said controllable transmission center wavelength sweep means to cause said transmission center wavelength sweep means to stop sweep of the transmission center wavelength of said first branched optical signal when the differentiated value generated by said differentiating circuit has a negative peak.

8. A device according to claim 7, wherein said light amplifier comprises a rare-earth-doped fiber as an amplification medium.

9. A device according to claim 7, wherein said light amplifier is a semiconductor optical amplifier.

10. A device according to claim 7, wherein said bandpass filter is a fiber type Fabry-Perot filter constituted by two opposing optical fibers whose opposing end faces are covered with half mirrors, and said transmission center wavelength sweep means comprises a piezoelectric actuator for changing a gap between said opposing end faces of said fiber of said fiber type Fabry-Perot fiber.

11. A light amplification device, comprising:

a light amplifier for amplifying an inputted optical signal;

a bandpass filter for transmitting an optical signal having a wavelength within a predetermined transmission band of optical signals output from said light amplifier;

an optical signal branching unit for branching the optical signal from said bandpass filter into first and second branched optical signals;

controllable transmission center wavelength sweep means included at least partially within said bandpass filter for repeatedly sweeping a transmission center wavelength of said first branched optical signal at a predetermined speed in a band of several fractions of a nm which is initially set and includes the wavelength of the optical signal;

a photoelectric converter for converting an intensity of said second branched optical signal transmitted through said bandpass filter into an electrical signal;

a differentiating circuit for performing first-order differentiation on the electrical signal converted by said photoelectric converter using time as a variable, and for generating a differentiated value representative of said first-order differentiation; and sweep center wavelength change means for receiving said differentiated value from said differentiating circuit and for supplying control signals to said controllable transmission center wavelength sweeps means for commanding said transmission center wavelength sweep means to change a transmission center wavelength of said first branched optical signal obtained when the differentiated value generated by said differentiating circuit becomes "0" as a center wavelength of a band subjected to a next sweep by said transmission center wavelength sweep means.

12. A light amplification device, comprising:

a light amplifier for amplifying an inputted optical signal;

a bandpass filter for transmitting an optical signal having a wavelength within a predetermined transmission band of optical signals output from said light amplifier;

an optical signal branching unit for branching the optical signal from said bandpass filter to first and second branched optical signals;

controllable transmission center wavelength sweep means included at least partially within said bandpass filter for sweeping a transmission center wavelength of said bandpass filter in a predetermined band at a predetermined speed;

a photoelectric converter for converting an intensity of said second branched optical signal transmitted through said bandpass filter into an electrical signal;

a differentiating circuit for performing first-order differentiation and second-order differentiation on the electrical signal converted by said photoelectric converter using time as a variable, and for generating first-order and second order differentiation values representative of said first and second-order differentiations, respectively;

narrow-band sweep means for receiving said second-order differentiation value from said differentiation circuit and for repeatedly sweeping a transmission center wavelength of said first branched optical signal at a predetermined speed in a band of several fractions of a nm using a transmission center wavelength of said first branched optical signal obtained when a negative peak value of the second-order value generated by said differentiating circuit is detected as a center; and sweep center wavelength setting means receiving said first-order differentiation value from said differentiation circuit and for setting a transmission center wavelength of said first branched optical signal obtained when the first-order value generated by said differentiating circuit becomes "0" to a center wavelength of a band subjected to a next sweep by said narrow-band sweep means while a transmission center wavelength is repeatedly swept by said narrow-band sweep means.

* * * * *

UNITED STATES PATENT AND TRADEMARK OFFICE
CERTIFICATE OF CORRECTION

PATENT NO. : 5,570,221
DATED : October 29, 1996
INVENTOR(S) : Masayuki Fujita

It is certified that error appears in the above-indentified patent and that said Letters Patent is hereby corrected as shown below:

Claim 5, Column 11, line 36, "generation" should be --generating--.

Signed and Sealed this

Twenty-fourth Day of December, 1996

Attest:

BRUCE LEHMAN

*Attesting Officer*  *Commissioner of Patents and Trademarks*